United States Patent [19]

Coleman et al.

[11] 3,891,073
[45] June 24, 1975

[54] CONVEYOR STOP

[75] Inventors: Bestor P. Coleman, Willow Springs; Kennedy McConnell, Riverdale, both of Ill.

[73] Assignee: Interlake, Inc., Chicago, Ill.

[22] Filed: May 7, 1973

[21] Appl. No.: 358,118

[52] U.S. Cl. ............................ 193/35 A; 193/40
[51] Int. Cl. ........................................ B65g 13/00
[58] Field of Search ....................... 193/35 A, 40

[56] References Cited
UNITED STATES PATENTS

| | | | |
|---|---|---|---|
| 1,487,573 | 3/1924 | Ingram | 193/40 |
| 2,194,219 | 3/1940 | Eggleston | 193/35 A X |
| 2,565,001 | 8/1951 | Schutt | 193/35 A |
| 3,017,007 | 1/1962 | McGrath | 193/40 |
| 3,532,201 | 10/1970 | McConnell | 193/35 A |

*Primary Examiner*—Evon C. Blunk
*Assistant Examiner*—James L. Rowland
*Attorney, Agent, or Firm*—Molinare, Allegretti, Newitt & Witcoff

[57] ABSTRACT

A load spacing mechanism for a conveyor includes an actuating member and a stop member, the latter of which is movable into a load stop position when the actuating member is depressed by the lead load. The stop member is spring urged into the load stop position whereby, if the lead load has not yet cleared the stop member, the stop member will remain in its retracted position until cleared by the load at which time the stop member will immediately move into the stop position to arrest movement of the next successive load.

12 Claims, 5 Drawing Figures

PATENTED JUN 24 1975

3,891,073

SHEET 1

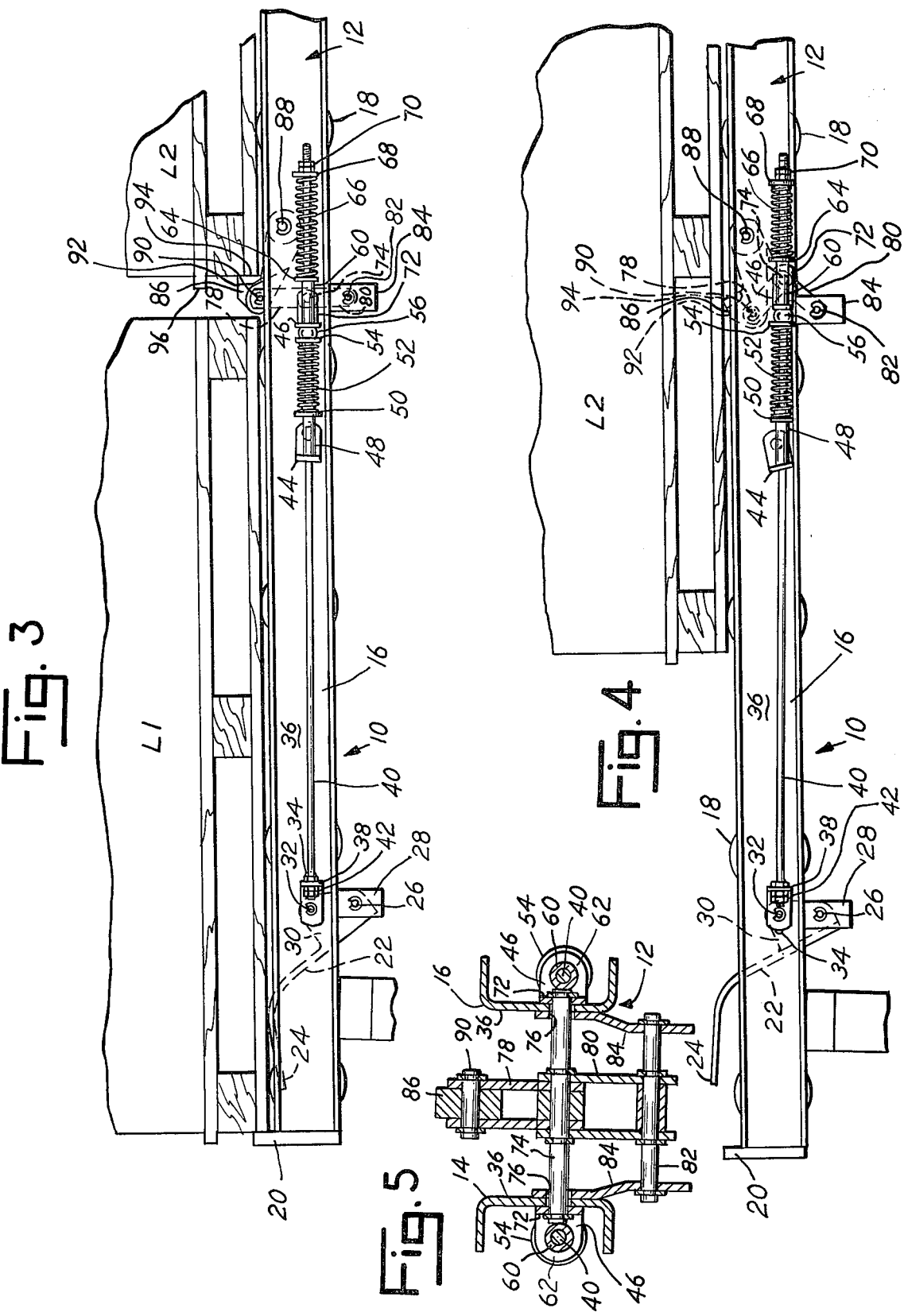

CONVEYOR STOP

BACKGROUND AND SUMMARY OF THE INVENTION

The present invention relates to a conveyor stop mechanism and, more particularly, to a conveyor load spacing mechanism for spacing successive loads on a conveyor.

In conventional inclined flow gravity conveyors, loads travel along the conveyor down its incline toward a delivery end where they are removed one by one. In such conveyors it is advantageous to prevent the entire run of loads positioned along the conveyor from bearing against the lead load at the delivery end of the conveyor so that the lead load can be easily removed from the conveyor. This is particularly desirable where the loads are very heavy such that the successive run of loads which bear against the lead load tend to wedge the lead load tightly against the end stop of the conveyor.

Various load stop and spacing mechanisms have been provided in the past to achieve this load spacing result. One such mechanism is shown in U.S. Pat. No. 3,532,201. In the mechanizm shown therein, an actuating lever is connected to a toggle link stop mechanism by a rigid rod linkage and these components are mounted adjacent the end of the conveyor. When the lead load is positioned over the actuating lever, it depresses the actuating lever whereby the stop mechanism is extended such that it is positioned in the path of the next successive load to arrest further movement of that load and space that load from the lead load. When the lead load is removed from the end of the conveyor, the actuating lever moves to an extended position and the stop mechanism is retracted to allow the next successive load to move down the conveyor and become the lead load.

In the aforementioned load spacing arrangement, it is important that the rod linkage length and distance between the actuating lever and the stop member be carefully adjusted or selected relative to the length of the loads or the pallets upon which the loads are carried. If the distance is too short, the stop mechanism will be extended too early and move upward toward its stop position before the lead load has cleared the stop mechanism. Since the actuating lever and stop mechanism are rigidly connected together by the linkage, the assembly will likely be sprung and damaged so as to become inoperative where extension is too early. Conversely, if the distance is too great, the stop mechanism will be extended too late such that it will be extended beneath the next successive load, rather than in front of the load. Such late extension not only will again result in damage to the rigid linkages, but also will likely result in the feeding of two loads to the end of the conveyor at the same time. In order to prevent the latter occurrence from happening, i.e. late extension, a braking mechanism is provided as shown in U.S. Pat. No. 3,532,201 for retarding movement of the next successive load temporarily in order to allow additional time for extension of the stop member. However, such braking mechanisms increase the cost of the stop and spacing assembly. It is also necessary in such prior mechanisms to locate the actuating lever proximate to the end stop of the conveyor, since location of the actuating lever near the stop mechanism would result in extension of the stop mechanism too early and consequent damage to the assembly. Positioning of the actuating lever away from the end stop of the conveyor minimizes possible damage by the tines of the fork lift truck. Moreover, since the rod linkage length must be accurately correlated to the length of the articles and/or pallets upon which the articles are carried, articles or pallets of only one given length may be handled for a given rod linkage length.

The load spacing mechanism constructed in accordance with the principles of the present invention overcomes these several aforementioned disadvantages while functioning to effectively space the next successive load in a run of loads on a conveyor from the lead load. In the load spacing mechanism of the present invention criticality of length of the mechanism is minimized and the mechanism may be substantially shortened. In the load spacing mechanism of the present invention damage to the mechanism is avoided in the event of either early or late extension of the stop mechanism of the present invention. In the load spacing mechanism of the present invention the stop member may be moved toward its extended stop position even though a lead load has not yet cleared the stop mechanism and the mechanism is thereby positioned in readiness to immediately move into its stop position with respect to the next succeeding load as soon as the lead load has cleared the mechanism. In the load spacing mechanism of the present invention, since criticality of the spacing between the mechanism components is minimized, the same mechanism may be employed for use with pallets of loads of differing lengths and thereby a substantial reduction in mechanism inventory is realized and loads of mixed pallet or load length may be handled simultaneously on a given conveyor without replacement of the mechanism of the present invention. Finally, positioning of the actuating lever relative to the conveyor end stop is not critical in the mechanism of the present invention. Thereby, the actuating lever of the mechanism of the present invention may be located away from the end stop of the conveyor to minimize fork lift damage.

In one principal aspect of the present invention, a load spacing mechanism for a load conveyor includes an actuating member which is movable between extended and retracted positions in response to the absence or presence of a load, stop means which is also movable between retracted and extended stop positions, linkage means extending between the actuating member and the stop means, and first and second pivotal mounting means for pivotally mounting the actuating member and the stop means for movement between their positions. The improvement, in combination therewith, comprises first urging means which urges the stop means to its extended stop position in response to movement of the actuating member, but permits the stop means to remain in its retracted position in the event that a load is positioned on the stop means, and second urging means urges the actuating member to its extended position and the stop means to its retracted position in the absence of a load on the actuating member, but is overcome by the actuating member when a load is positioned on the actuating member.

In another principal aspect of the present invention, the aforementioned mechanism includes, in combination therewith, a conveyor having supporting portions along which loads travel in a defined path and wherein the actuating member and stop means extend above the supporting portions and into the defined path of the travelling load when in their extended positions and wherein the actuating member and stop means are positioned adjacent or below the supporting portions when in their retracted positions.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 3 is a side elevation view of the conveyor shown in FIG. 2 but in which the lead load has progressed to its rest position and the stop member has been extended to arrest movement of the next successive load;

FIG. 4 is a side elevation view of the conveyor shown in FIG. 3 in which the lead load has been removed from the conveyor and the next successive load is assuming the position as lead load; and FIG. 5 is a cross sectioned end elevation view of the stop mechanism of the load spacing mechanism, as viewed substantially along line 5 — 5 in FIG. 1.

DESCRIPTION OF THE PREFERRED EMBODIMENT

Figure 2:
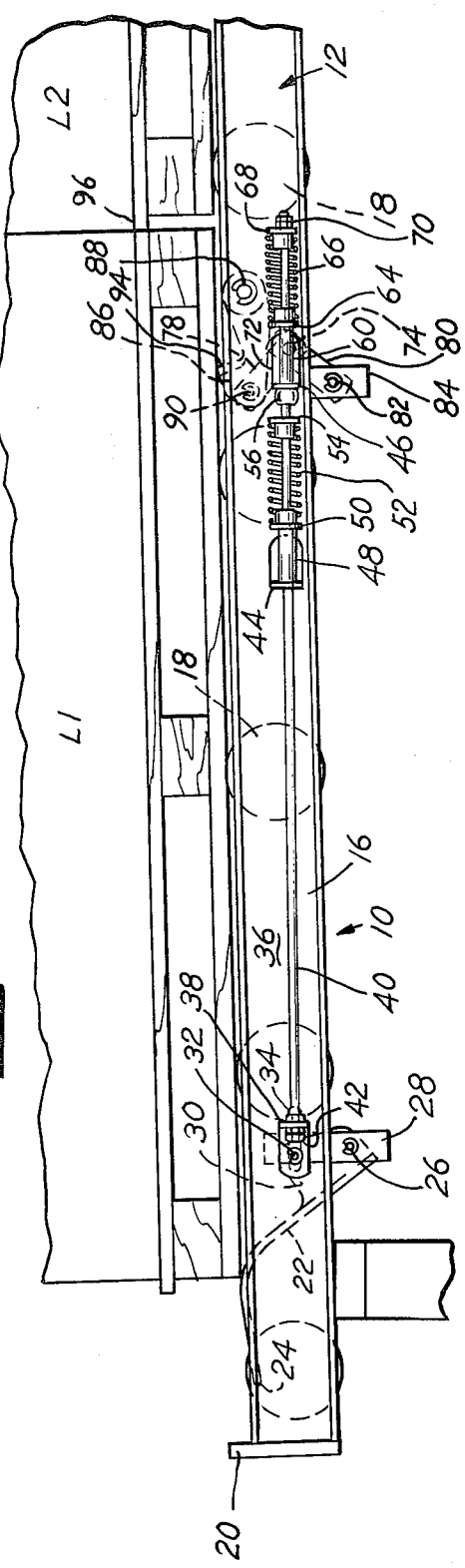
FIG. 2 is a side elevation view of the end of an inclined conveyor including the load spacing mechanism of the present invention, and showing the load positioned over the actuating lever, but not yet having cleared the stop member.

Referring particularly to FIGS. 2-4, the load spacing mechanism of the present invention is shown mounted adjacent the end of an inclined roller conveyor, generally 10. The conveyor comprises a pair of support frames 12, only one of which is shown, spaced apart so as to support the opposite edges of the loads to be conveyed on the conveyor. The spaced support frames 12 each comprise a pair of C-shaped beam members 14 and 16 which are spaced apart so as to receive load support idler rollers 18 at intervals along their length. The frames 12 are preferably inclined slightly such that the loads to be conveyed by the conveyor move down the conveyor by gravity. A suitable end stop 20 is also positioned at the end of each support frame to prevent the loads from running off the end of the conveyor and to position the lead load L1 such that it may be removed by suitable means, such as a fork lift truck, from the end of the conveyor.

The load spacing mechanism of the present invention is mounted to at least one, and preferably both of the conveyor support frames 12 adjacent the ends thereof. The purpose of the load spacing mechanism of the present invention is to prevent the successive loads L2, etc. from wedging the lead load L1 against the end stop 20 and thereby facilitate removal of the lead load L1 from the end of the conveyor.

The load spacing mechanism of the present invention comprises an actuating lever 22, an end 24 of which is adapted to be positioned in the path of the lead load L1. The actuating lever 22 is mounted for pivotal movement about a pivot pin 26 which is fastened between a pair of downwardly depending brackets 28 which are attached to the inside surface of both of the beams 14 and 16.

The actuating lever 22 also includes a pair of spaced projections 30 adjacent its bottom end which extend upward from the pivot pin 26. A second pin 32 slideably extends through the projections 30 and through a longitudinally extending slot 34 defined in the web portion 36 of each of the beams 14 and 16. A pair of L-shaped brackets 38, in turn, are fixed to the ends of pin 32 and an elongate linkage rod 40 is bolted, as by nuts 42, to the other leg of the L-shaped brackets.

Figure 1:
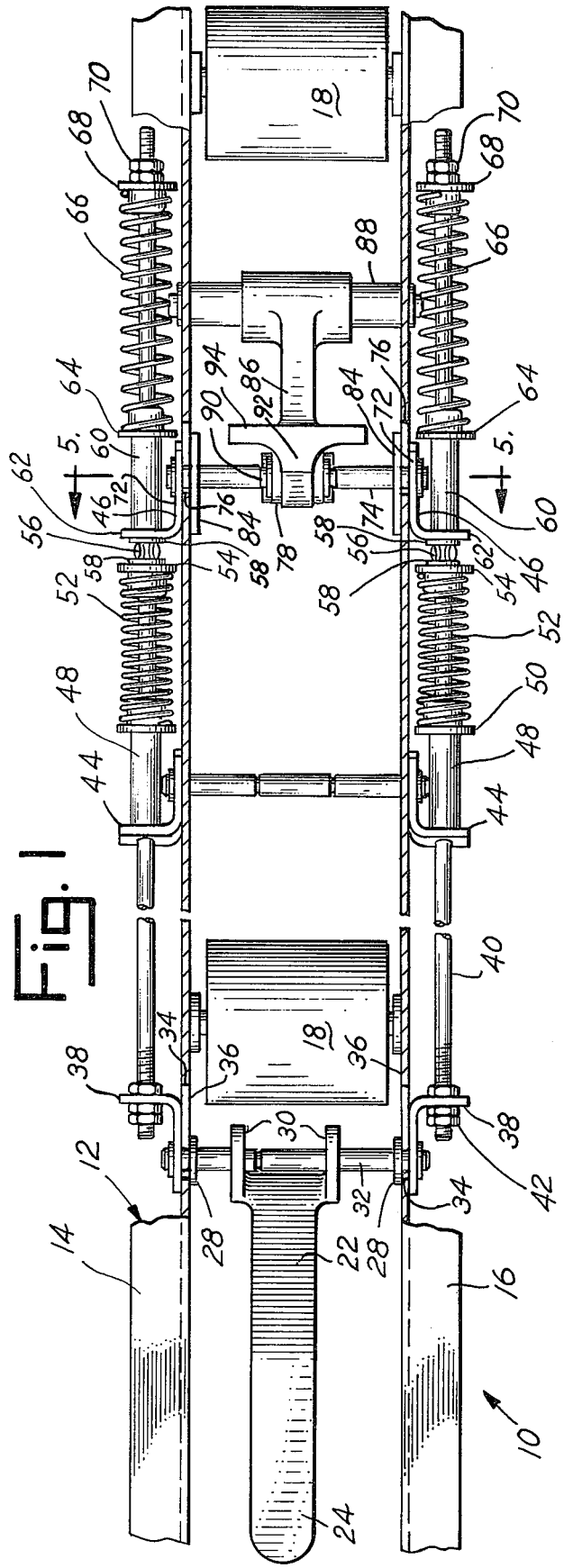
FIG. 1 is a plan view of a preferred embodiment of load spacing mechanism constructed in accordance with the principles of the present invention.

Each of the rods 40 extend longitudinally away from the end of the conveyor, through fixed L-shaped guide brackets 44 and through and beyond still further movable L-shaped brackets 46. A portion of each of the rods 40 between brackets 44 and 46 is journalled through a cylindrical spacer member 48, one end of which bears against the outwardly extending leg of the fixed bracket 44 and the other end of which is mounted a spring retainer head 50. A spring 52 is positioned between the retainer head 50 and a second retainer head 54 adjacent bracket 46. Each of the rods 40 is preferably flattened at 56, by stamping or the like, between the spring retainer head 54 and bracket 46 and a pair of washers 58 are positioned on each side of the flattened portion as shown in FIG. 1. Thereby, upon movement of the rod 40 the flattened portion 56 will either cause the spring 52 to be compressed or will cause the bracket 46 to be moved to the right as viewed in FIG. 1 depending upon the direction of movement of the rod.

Also journalled upon the rod is a second spacer member 60, one end of which bears against outwardly extending leg 62 of the bracket 46 and the other end of which includes a spring retainer head 64. A second spring 66 is positioned over the end of the rod 40 between the spring retainer head 64 and a second spring retainer head 68 which is fixed in place at the end of the rod by nuts 70 threaded onto the end of the rod.

Referring particularly to FIGS. 1 and 5, the leg 72 of the L-shaped bracket 46 which extends parallel to the exterior of the beam webs 36 is fixed to a transverse pin 74 and pin 74 is movable back and forth in longitudinally extending slots 76 in the beam webs 36. A pair of toggle links 78 and 80 are mounted between the beams 14 and 16. The bottom toggle link 80 is pivotally attached at one end to a pivot pin 82 which is fixed between downwardly depending brackets 84 and the top end of the bottom toggle link 80 and the bottom end of the upper toggle link 78 are mounted for pivotal movement relative to each other about slideable pin 74.

An L-shaped stop member 86 is pivotally mounted about a pivot pin 88 which extends through one end of the stop member 86 and is attached between the beams 14 and 16. The other end of the stop member 86, in turn, is pivotally mounted by pin 90 to the upper end of the upper pivot link 78. Extending above the pivotal mounting pin is a stop projection 92 having a vertically extending stop surface 94 which is adapted to engage the leading edge of the loads, or their pallets if the loads are pallet mounted, as they move down the conveyor 10.

A description of the operation of the preferred embodiment of load spacing mechanism will now be described.

Referring particularly to FIG. 3, a condition of the conveyor is shown in which the lead load L1 is positioned at rest against the fixed stop 20 in readiness for removal from the conveyor 10. The load L1 rests upon the actuating lever 22 so as to force the lever downward in a counterclockwise direction as shown in FIG. 3 to its retracted position. When the actuating lever 22 is held down as shown, the rod 40 will be drawn to the left. In this condition, the flattened portion 56 will compress spring 52 between the fixed heads 50 and 54 and spring 66 will also be compressed between heads 64 and 68. Thus, the bracket 38 and its associated pin 32 will be drawn to the furthest left of the slot 34 to the position shown in FIG. 1. Thereby, the toggle links 78 and 80 will be straightened as shown in FIG. 3 by the force of spring 66 which moves bracket 46 to its furthest left position in slot 76, also as shown in FIG. 1. When the links 78 and 80 straighten, the stop member 86 will be pushed upward such that its stop surface 94 projects above the uppermost plane of the rollers 18 and into the path of the bottom leading edge of the next successive load L2. Thereby movement of load L2 down the incline is arrested and load L2 is held in slightly spaced relationship away from the trailing end of load L1.

Now referring to FIG. 4, when the lead load L1 is removed from the end of the conveyor, the actuating lever 22 will no longer be held in its retracted position. Thus, the energy stored in compressed spring 52 will exert a force to the right as viewed in FIG. 1 against the flattened portion 56 of the rod 40, causing the rod to move to the right. As the rod 40 moves to the right, the actuating lever 22 will be rotated in a clockwise direction in which it will assume an extended position above the level of the rollers 18 as shown in FIG. 4 and in the path of load L2 as it moves down the conveyor. Movement of the rod 40 to the right will also urge the bracket 46 to the right along with the pivot pin 74, causing the toggle links 78 and 80 to assume a V configuration as shown in FIG. 4. When the toggle links are buckled to assume this configuration, the stop member 86 will be drawn downward to its retracted position and will no longer arrest the movement of load L2. Load L2 will now commence movement down the conveyor to become the lead load as shown in FIG. 4.

In the event that load L2 contacts the actuating lever 22 prior to the time that its trailing end has passed over the stop member 86, the earlier spacing mechanisms would be subject to damage, since the stop member 86 would be prematurely urged into its extended position to contact the bottom of the load L2. However, in the present invention the likelihood of such damage is eliminated and, in fact, it is preferred that actuation of the stop member 86 toward its extended position actually commences prior to clearance of the trailing end of the load. Such early actuation not only allows the shortening of the rod 40, but also insures that the stop member 86 will immediately be ready to extend into stopping relationship to the next succeeding load as soon as the lead load has cleared and also eliminates the need to stock numerous different rod lengths for use with differing length loads or pallets. Moreover, since early actuation is harmless to the mechanism, mixed loads may be readily handled by the conveyor and the actuating lever 22 may be relocated nearer the stop member 86 and away from the end stop 20 to minimize the possibility of damage to the mechanism from the tines of the fork lift truck.

Finally, referring to FIG. 2, load L2 will now become the lead load L1 and as the leading end of the load L1 strikes the actuating lever 22 the lever is rotated by the load in a counterclockwise direction and into its retracted position. As the lever 22 rotates, the rod 40 will move to the left so as to compress springs 52 and 66 and links 78 and 80 will tend to again assume a straightened position as shown in FIG. 3. However, if the trailing end of load L1 still has not cleared the stop member 86, stop member end 92 will come into contact with the still overlying trailing end of the load L1 as shown in FIG. 2. Damage to the stop member, however, will be prevented since the stop member 86 will not fully move from its retracted position and any forces exerted by the moving load L1 on the stop member will be absorbed by the spring 66 which is urging the stop member toward its extended stop position. The stop member will be positioned in immediate readiness, however, for movement to its fully extended position as soon as the trailing end of the load L1 passes over. Once the trailing end has cleared the stop member, the energy stored in spring 66 will immediately urge the bracket 46 and pin 74 to the far left as shown in FIG. 1 so as to fully straighten the links 78 and 80 and position the stop surface 94 in arresting engagement with the leading edge of the next load L2 as shown in FIG. 3. In order to insure that a sufficient space is present between the trailing end of load L1 and the leading edge of load L2 to allow the stop mechanism to extend in front of load L2, either a braking mechanism such as shown in U.S. Pat. No. 3,532,201 may be provided or the top board of the pallets may have a slight overhang 96. In the latter event the expense of the braking mechanism may be avoided.

It will be understood that the embodiment of the present invention which has been described is merely illustrative of an application of the principles of the invention. Numerous modifications may be made by those skilled in the art without departing from the true spirit and scope of the invention.

What is claimed is:

1. A load spacing mechanism for a load conveyor including an actuating member movable between extended and retracted positions in response to the absence of presence of a load thereon respectively, stop means movable between retracted and extended stop positions, said actuating member and stop means being longitudinally spaced from each other in the direction of movement of the load on the conveyor, elongate linkage means continuously extending between said longitudinally spaced actuating member and stop means, said elongate linkage means being mounted for longitudinal movement toward and away from said spaced actuating member and stop means, and first and second pivotal mounting means for pivotally mounting said actuating member and stop means respectively for movement between said positions, wherein the improvement comprises in combination therewith:

first urging means acting between said elongate linkage means and said stop means urging said stop means to said extended stop position in response to a force exerted on said first urging means by and upon said longitudinal movement of said elongate linkage means in a first direction due to movement of said actuating member to said retracted position, but permitting said stop means to remain in said retracted position in the event that a load is positioned on both said stop means and actuating member, and second urging means urging said linkage means to longitudinally move in a second direction opposite said first direction to move said actuating member to said extended position and said stop means to said retracted position in the absence of a load on said actuating member, but being overcome by said actuating member when a load is positioned on said actuating member.

2. The mechanism of claim 1 wherein said first and second urging means comprise resilient springs.

3. The mechanism of claim 1 wherein said linkage means comprise an elongate rod, said stop means comprise a stop member pivotally movable between said retracted and extended stop positions, link means one end of which is pivotally connected to said stop member and the other end of which is connected to said first urging means, and said first urging means comprise spring means extending between said link means and a location on said rod opposite said actuating member, whereby when said actuating member is moved to said retracted position said spring means is compressed to exert a force via said link means which tends to urge said stop member to said extended stop position.

4. The mechanism of claim 3 wherein said second urging means also comprise spring means extending between said link means and a location on said rod toward said actuating member, whereby said actuating member is urged to said extended position and when in said position said stop member is urged toward its said retracted position.

5. The mechanism of claim 1 including in combination therewith a conveyor having supporting portions along which loads travel in a defined path, said actuating member and said stop means extending above said supporting portions and into said defined path of the travelling load when in their said extended positions and being positioned beneath said defined path of the travelling load when in their said retracted positions.

6. The combination of claim 5 wherein said first urging means is overcome by the weight of the load on said stop means to retain said stop means in said retracted position when a load is positioned on both said actuating member and said stop means.

7. In the combination of claim 5 wherein said linkage means comprise an elongate rod, said stop means comprise a stop member pivotally movable between said retracted and extended stop positions, link means one end of which is pivotally connected to said stop member and the other end of which is connected to said first urging means, and said first urging means comprise spring means extending between said link means and a location on said rod opposite said actuating member, whereby when said actuating member is moved to said retracted position said spring means is compressed to exert a force via said link means which tends to urge said stop member to said extended stop position.

8. The combination of claim 7 wherein said second urging means also comprise spring means extending between said link means and a location on said rod toward said actuating member, whereby said actuating member is urged to said extended position and when in said position said stop member is urged toward its said retracted position.

9. A load spacing mechanism for a load conveyor including an actuating member movable between extended and retracted positions in response to the absence or presence of a load thereon respectively, stop means movable between retracted and extended stop positions, said actuating member and stop means being longitudinally spaced from each other in the direction of movement of the load on the conveyor, elongate linkage means extending between said longitudinally spaced actuating member and stop means, said elongate linkage means being mounted for longitudinal movement toward and away from said spaced actuating member and stop means, and first and second pivotal mounting means for pivotally mounting said actuating member and stop means respectively for movement between said positions, wherein the improvement comprises in combination therewith:

first urging means urging said stop means to said extended stop position in response to said longitudinal movement of said elongate linkage means in a first direction due to movement of said actuating member to said retracted position, but permitting said stop means to remain in said retracted position in the event that a load is positioned on both said stop means and actuating member, second urging means urging said linkage means to longitudinally move in a second direction opposite said first direction to move said actuating member to said extended position and said stop means to said retracted position in the absence of a load on said actuating member, but being overcome by said actuating member when a load is positioned on said actuating member, wherein said linkage means comprise an elongate rod, said stop means comprise a stop member pivotally movable between said retracted and extended stop positions, link means one end of which is pivotally connected to said stop member and the other end of which is connected to said first urging means, and said first urging means comprise spring means extending between said link means and a location on said rod opposite said actuating member, whereby when said actuating member is moved to said retracted position said spring means is compressed to exert a force via said link means which tends to urge said stop member to said extended stop position.

10. The mechanism of claim 9 wherein said second urging means also comprise spring means extending between said link means and a location on said rod toward said actuating member, whereby said actuating member is urged to said extended position and when in said position, said stop member is urged toward its said retracted position.

11. The mechanism of claim 9 including in combination therewith a conveyor having supporting portions along which loads travel in a defined path, said actuating member and said stop means extending above said supporting portions and into said defined path of the travelling load when in their said extended positions and being positioned beneath said defined path of the travelling load when in their said retracted positions.

12. The combination of claim 11 wherein said second urging means also comprise spring means extending between said link means and a location on said rod toward said actuating member, whereby said actuating member is urged to said extended position and when in said position, said stop member is urged toward its said retracted position.

* * * * *